US009447266B2

(12) United States Patent
Lavallée et al.

(10) Patent No.: US 9,447,266 B2
(45) Date of Patent: Sep. 20, 2016

(54) FLUORINE-CONTAINING POLYMER COMPOSITION

(71) Applicant: 3M INNOVATIVE PROPERTIES COMPANY, St. Paul, MN (US)

(72) Inventors: Claude Lavallée, Maplewood, MN (US); Gregg D. Dahlke, St. Paul, MN (US); Denis Duchesne, Woodbury, MN (US); Tatsuo Fukushi, Woodbury, MN (US); Werner M. A. Grootaert, Oakdale, MN (US); Miguel A. Guerra, Woodbury, MN (US); Zai-Ming Qiu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/883,690

(22) Filed: Oct. 15, 2015

(65) Prior Publication Data
US 2016/0032087 A1   Feb. 4, 2016

Related U.S. Application Data

(62) Division of application No. 14/364,871, filed as application No. PCT/US2012/068926 on Dec. 11, 2012, now Pat. No. 9,187,630.

(60) Provisional application No. 61/576,391, filed on Dec. 16, 2011.

(51) Int. Cl.
| C08L 23/06 | (2006.01) |
| C08L 27/12 | (2006.01) |
| C08F 214/22 | (2006.01) |

(52) U.S. Cl.
CPC ............. *C08L 23/06* (2013.01); *C08L 27/12* (2013.01); *C08F 214/22* (2013.01); *C08L 2205/03* (2013.01); *C08L 2205/06* (2013.01); *C08L 2207/066* (2013.01)

(58) Field of Classification Search
CPC .... C08L 23/06; C08L 27/12; C08L 2205/03; C08L 2205/06; C08L 2207/066; C08F 214/22
See application file for complete search history.

(56) References Cited

U.S. PATENT DOCUMENTS

| 4,544,458 A | 10/1985 | Grot |
| 5,284,184 A | 2/1994 | Noone |
| 5,285,002 A | 2/1994 | Grootaert |
| 5,378,782 A | 1/1995 | Grootaert |
| 5,830,947 A | 11/1998 | Blong |
| 6,002,055 A | 12/1999 | Yang |
| 6,277,919 B1 | 8/2001 | Dillon |
| 6,624,328 B1 | 9/2003 | Guerra |
| 7,375,157 B2 | 5/2008 | Amos |
| 2004/0260022 A1 | 12/2004 | Amos |
| 2007/0015937 A1 | 1/2007 | Hintzer |
| 2010/0311906 A1 | 12/2010 | Lavallee |

FOREIGN PATENT DOCUMENTS

| EP | 0289869 | 9/1988 |
| WO | WO 2012-082454 | 6/2012 |
| WO | WO 2012-082546 | 6/2012 |
| WO | WO 2012-082551 | 6/2012 |
| WO | WO 2012-082695 | 6/2012 |
| WO | WO 2012-082703 | 6/2012 |
| WO | WO 2012-083107 | 8/2012 |
| WO | WO 2012-166578 | 12/2012 |

OTHER PUBLICATIONS

Rauwendaal, Polymer Extrusion, "Different Types of Extruders," Hanser Publishers, Munich Vienna, New York, pp. 23-48, (1986).
Rudin, "Fluorocarbon elastomer aids polyolefin extrusion", Plastics Engineering, Mar. 1986, vol. 42, pp. 63-66.
Shroff, "Assessment of NMR and Rheology for the Characterization of LCB in Essentially Linear Polyethylenes", Macromolecules, 2001, vol. 34, pp. 7362-7367.
Shroff, "Long-Chain-Branching Index for Essentially Linear Polyethylenes", Macromolecules, 1999, vol. 32, pp. 8454-8464.
Westover, "Melt Extrusion", Encyclopedia of Polymer Science and Technology, 1968, vol. 8, pp. 573-581.
International Search Report for PCT International Application No. PCT/US2012/068926, mailed on Jun. 27, 2013, 5pgs.

*Primary Examiner* — Nathan M Nutter
(74) *Attorney, Agent, or Firm* — Julie Lapos-Kuchar

(57) ABSTRACT

Described herein is a melt-processible polymer composition comprising:
  a non-fluorinated melt-processible polymer; and
  a fluorine-containing polymer comprising an end-group having a structures from group consisting of:

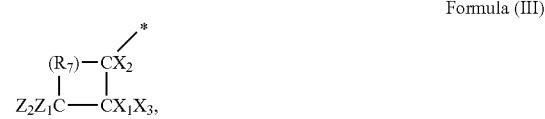

Formula (III)

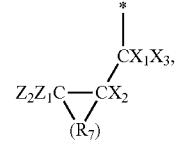

Formula (IV)

and combinations thereof;
wherein $X_1$, $X_2$, and $X_3$ are each independently selected from H, F, Cl, a $C_1$ to $C_4$ alkyl group, and a $C_1$ to $C_4$ fluorinated alkyl group; $R_7$ is a linking group comprising at least 2 or more catenary atoms; and $Z_1$ and $Z_2$ are independently selected from F, $CF_3$, and a perfluoroalkyl group.

15 Claims, No Drawings

FLUORINE-CONTAINING POLYMER COMPOSITION

CROSS REFERENCE TO RELATED APPLICATIONS

This application is a divisional application of U.S. application Ser. No. 14/364,871, filed Jun. 12, 2014, which is a national stage filing under 35 U.S.C. 371 of PCT/US2012/068926, filed Dec. 11, 2012, which claims priority to U.S. Provisional Application No. 61/576,391, filed Dec. 16, 2011, the disclosures of which are incorporated by reference in their entirety herein.

TECHNICAL FIELD

The present disclosure relates to melt-processible polymer compositions that comprise a mixture of a non-fluorinated melt-processible polymer and a fluorine-containing polymer. The fluorine-containing polymer may be used as a polymer processing aid.

BACKGROUND

For any melt processible thermoplastic polymer composition, there exists a critical shear rate above which the surface of the extrudate becomes rough and below which the extrudate will be smooth. See, for example, R. F. Westover, Melt Extrusion, Encyclopedia of Polymer Science and Technology, Vol. 8, pp 573-81 (John Wiley & Sons 1968). The desire for a smooth extrudate surface competes, and must be optimized with respect to, the economic advantages of extruding a polymer composition at the fastest possible speed (i.e. at high shear rates).

Some of the various types of extrudate roughness and distortion observed in high and low density polyethylenes are described by A. Rudin, et al., in Fluorocarbon Elastomer Aids Polyolefin Extrusion, Plastics Engineering, March 1986, on 63-66. The authors state that for a given set of processing conditions and die geometry, a critical shear stress exists above which polyolefins such as linear low-density polyethylene (LLDPE), high-density polyethylene (HDPE), and polypropylene suffer melt defects. At low shear rates, defects may take the form of "sharkskin", a loss of surface gloss that in more serious manifestations appears as ridges running more or less transverse to the extrusion direction.

At higher rates, the extrudate can undergo "continuous melt fracture" becoming grossly distorted. At rates lower than those at which continuous melt fracture is first observed, LLDPE and HDPE can also suffer from "cyclic melt fracture", in which the extrudate surface varies from smooth to rough. The authors state further that lowering the shear stress by adjusting the processing conditions or changing the die configuration can avoid these defects to a limited extent, but not without creating an entirely new set of problems.

For example, extrusion at a higher temperature can result in weaker bubble walls in tubular film extrusion, and a wider die gap can affect film orientation.

There are other problems often encountered during the extrusion of thermoplastic polymers. They include a build-up of the polymer at the orifice of the die (known as die build up or die drool), increase in back pressure during extrusion runs, and excessive degradation or low melt strength of the polymer due to high extrusion temperatures. These problems slow the extrusion process either because the process must be stopped to clean the equipment or because the process must be run at a lower speed.

Certain branched processing aids are known to partially alleviate melt defects in extrudable thermoplastic hydrocarbon polymers and allow for faster, more efficient extrusion.

U.S. Pat. No. 7,375,157 (Amos et al.) describes the use of a fluoropolymer having long chain branching for use as a polymer melt additive. The fluoropolymers are derived from bisolefins or halogenated olefins, which comprise a halogen that is readily abstracted during the polymerization, such as bromine or iodine.

U.S. Pat. Publ. No. 2010/0311906 (Lavallee et al.) also describes the use of a fluoropolymer having long chain branching for use as a polymer melt additive. The fluoropolymers are derived from a fluorinated olefin monomer and a fluorinated bisolefinic ether.

SUMMARY

Despite the many existing processing aids based on fluoropolymers as known in the art, there continues to be a need to find further processing aids. The present disclosure is related to an alternative long chain branched polymer that may be used as a processing aid in melt-processible polymers. Desirably, such processing aids are highly effective in reducing melt defects in the processing, in particular extrusion, of non-fluorinated melt-processible polymers. Preferably, the processing aid is capable of reducing die drool and/or reducing the back pressure during extrusion of the non-fluorinated polymer.

In one aspect, a melt-processible polymer composition is provided comprising:

a non-fluorinated melt-processible polymer; and a fluorine-containing polymer comprising an end-group having a structures from group consisting of:

Formula (III)

Formula (IV)

and combinations thereof;

wherein $X_1$, $X_2$, and $X_3$ are each independently selected from H, F, Cl, a $C_1$ to $C_4$ alkyl group, and a $C_1$ to $C_4$ fluorinated alkyl group; $R_7$ is a linking group comprising at least 2 or more catenary atoms; and $Z_1$ and $Z_2$ are independently selected from F, $CF_3$, and a perfluoroalkyl group.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more.

"and/or" is used to indicate one or both stated cases may occur, for example A and/or B includes, (A and B) and (A or B).

"Oligomer" means less than 20,000 g/mol, less than 15,000 g/mol, less than 10,000 g/mol, less than 5,000 g/mol, less than 2,000 g/mol, less than 1,000 g/mol, and even less than 500 g/mol.

"Linking group" means a divalent linking group. In one embodiment, the linking group includes at least 1 carbon atom (in some embodiments, at least 2, 4, 8, 10, or even 20 carbon atoms). The linking group can be a linear or branched, cyclic or acyclic structure, that may be saturated or unsaturated, substituted or unsubstituted, and optionally contains one or more hetero-atoms selected from the group consisting of sulfur, oxygen, and nitrogen, and/or optionally contains one or more functional groups selected from the group consisting of ester, amide, sulfonamide, carbonyl, carbonate, urethane, urea, and carbamate. In another embodiment, the linking group does not comprise a carbon atom and is a catenary heteroatom such as oxygen, sulfur, or nitrogen.

"Melt-processible" or "suitable for melt-processing" is meant that the respective polymer or composition can be processed in commonly used melt-processing equipment such as, for example, an extruder. For example, a melt processible polymer may typically have a melt flow index of 5 g/10 minutes or less, preferably 2 g/10 minutes or less (measured according to ASTM D1238 at 190 C, using a 2160 g weight) but still more than 0.2 g/10 minutes. A melt-processible polymer may also have a melt flow index (MFI 265/5) of 20 g/10 minutes or less or 12 g/min or less but greater than 0.1 g/10 min.

"Sulfinate" is used to indicate both sulfinic acids and sulfinic acid salts.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Fluorine-Containing Polymers

Recently, unique monomers and oligomers comprising pendent sulfinic acids and salts thereof have been discovered. See U.S. Pat. Publ. No. 2014-0088322, U.S. Pat. No. 8,907,125, U.S. Pat. Publ. No. 2013-0253220, U.S. Pat. Publ. No. 2013-0281648, U.S. Pat. No. 8,946,465, and U.S. Pat. Publ. No. 2013-0267658, all herein incorporated by reference. The present disclosure is directed toward a composition comprising a fluorine-containing polymer derived from the polymerization of a monomer and a sulfinate-containing molecule.

The sulfinate-containing molecule is selected from the group consisting of:

(a) $CX_1X_3=CX_2-(R)_p-CZ_1Z_2-SO_2M$      Formula (I)

(b)

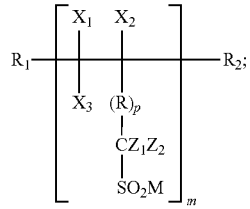

Formula (II)

and (c) combinations thereof, wherein $X_1$, $X_2$, and $X_3$ are each independently selected from H, F, Cl, a $C_1$ to $C_4$ alkyl group, and a $C_1$ to $C_4$ fluorinated alkyl group; R is a linking group; $Z_1$ and $Z_2$ are independently selected from F, $CF_3$, and a perfluoroalkyl group; $R_1$ and $R_2$ are end-groups; p is 0 or 1; m is at least 2; and M is a cation.

In one embodiment R may be non-fluorinated, partially fluorinated, or perfluorinated. In some embodiments, the hydrogen atom in R may be replaced with a halogen other than fluorine, such as a chlorine. R may or may not comprise double bonds. R may be substituted or unsubstituted, linear or branched, cyclic or acyclic, and may optionally comprise a functional group (e.g., esters, ethers, ketones, amines, halides, etc.). In one embodiment, R is a catenary heteroatom such as oxygen, sulfur, or nitrogen.

$R_1$ and $R_2$ are end-groups generated during oligomerization. These end-groups are independently selected from hydrogen, iodine, bromine, chlorine, a linear or branched alkyl, and a linear or branched fluoroalkyl group, optionally containing catenary heteroatoms. In some embodiments, the alkyl or fluoroalkyl group has up to 20 carbon atoms. These end-groups are determined based on the initiator or chain transfer agent and reaction conditions used to form the oligomer. For example, when a nonfluorinated initiator is used, hydrogen atoms may be present as $R_1$ and $R_2$ in Formula (II). In one embodiment, $R_1$ and $R_2$ are perfluorinated such as when a perfluorinated initiator is used.

As used herein M represents a cation. Exemplary cations useful in the present disclosure include $H^+$, $NH_4^+$, $PH_4^+$, $H_3O^+$, $Na^+$, $Li^+$, $Cs^+$, $Ca^{+2}$, $K^+$, $Mg^{+2}$, $Zn^{+2}$, and $Cu^{+2}$, and/or an organic cation including, but not limited to $N(CH_3)_4^+$, $NH_2(CH_3)_2^+$, $N(CH_2CH_3)_4^+$, $NH(CH_2CH_3)_3^+$, $NH(CH_3)_3^+$, $((CH_3CH_2CH_2CH_2)_4)P^+$, and combinations thereof.

Formula (II) as disclosed herein is an oligomer, meaning that Formula (II) has a number average molecular weight of no more than 20,000 grams/mole, 15,000 grams/mole, 10,000 grams/mole, 5,000 grams/mole, 2,000 grams/mole, 1000 grams/mol, or even 500 grams/mole. In one embodiment, m is at least 1, 2, 3, 4, 6, 8, 10, or even at least 15.

In one embodiment, the sulfinate-containing molecule of Formulas (I) or (II), R is selected from: $-(CH_2)_a-$, $-(CF_2)_a-$, $-O-(CF_2)_a-$, $-(CF_2)_a-O-(CF_2)_b-$, $-O(CF_2)_a-O-(CF_2)_b-$, $-(CF_2)_a-[O-(CF_2)_b]_c-$, $-O(CF_2)_a-[O-(CF_2)_b]_c-$, $-[(CF_2)_a-O]_b-[(CF_2)_c-O]_d-$, $-O[(CF_2)_a-O]_b-[(CF_2)_c-O]_d-$, $-O-$

[CF$_2$CF(CF$_3$)O]$_a$—(CF$_2$)$_b$—, and combinations thereof, wherein a, b, c, and d are independently at least 1, 2, 3, 4, 10, 20, etc.

In one embodiment, the sulfinate-containing molecule of Formula (I) is selected from the group consisting of: CF$_2$=CF—O(CF$_2$)$_n$—SO$_2$M; CF$_2$=CF—O[CF$_2$CF(CF$_3$) O]$_n$(CF$_2$)$_o$—SO$_2$M; CH$_2$=CH—(CF$_2$)$_n$—SO$_2$M; and combinations thereof, where n is at least 1; o is at least 1; and M is a cation.

In one embodiment, the sulfinate-containing molecule of Formula (II) comprises a segment selected from the group consisting of:

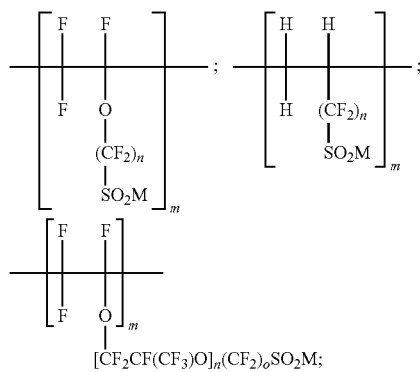

[CF$_2$CF(CF$_3$)O]$_n$(CF$_2$)$_o$SO$_2$M;

and combinations thereof, where n is at least 1; m is at least 1; o is at least 1, and M is a cation.

The oligomers and monomers of the present disclosure can be made using methods as disclosed in U.S. Prov. Appl. Nos. 61/492,885, 61/424,138, 61/424,109, 61/424,107, 61/424,146, and 61/424,153, all filed Dec. 17, 2010, all herein incorporated by reference.

In the present disclosure, a fluorine-containing polymer is derived from the polymerization of a monomer and a sulfinate-containing molecule. The monomer is ethylenically unsaturated and can be selected from non-fluorinated, partially fluorinated, fully fluorinated monomers, and combinations thereof.

In one embodiment, the monomer is selected from: dienes (including nonfluorianted, partially fluorinated and perfluorinated dienes, for example CH$_2$=CHR$_f$CH=CH$_2$, wherein Rf is a perfluorinated alkylene group, which may comprise 2, 3, 4, 5, 6, 7, 8, 9, 10, 11, 12 carbon atoms for example), halogenated alkenes, a fluoroalkyl substituted ethylene, allyl iodide, fluorinated alkyl vinyl ethers, fluorinated alkoxy vinyl ethers, olefins, acrylates, styrene, vinyl ethers, and combinations thereof.

Exemplary monomers include: tetrafluoroethylene, hexafluoropropylene, trifluoroethylene, vinylidene fluoride, vinyl fluoride, bromotrifluoroethylene, chlorotrifluoroethylene, CF$_3$CH=CF$_2$, C$_4$F$_9$CH=CH$_2$, CF$_2$=CHBr, CH$_2$=CHCH$_2$Br, CF$_2$=CFCF$_2$Br, CH$_2$=CHCF$_2$CF$_2$Br, CH$_2$=CHI, CF$_2$=CHI, CF$_2$=CFI, CH$_2$=CHCH$_2$I, CF$_2$=CFCF$_2$I, CH$_2$=CHCF$_2$CF$_2$I, CF$_2$=CFCH$_2$CH$_2$I, CF$_2$=CFCF$_2$CF$_2$I, CH$_2$=CH(CF$_2$)$_6$CH$_2$CH$_2$I, CF$_2$=CFOCF$_2$CF$_2$I, CF$_2$=CFOCF$_2$CF$_2$CF$_2$I, CF$_2$=CFOCF$_2$CF$_2$CH$_2$I, CF$_2$=CFCF$_2$OCH$_2$CH$_2$I, CF2=CFO(CF2)3-OCF2CF2, CH2=CHBr and others as is known in the art.

In the present disclosure, the oligomers or monomers comprising the sulfinic acid or salt thereof, may be used in polymerization reactions of polymers. Although not wanting to be bound by theory, it is believed that the fluorinated sulfinate anion (RfSO$_2^-$), acting as an electron donor to form a fluorinated radical (Rf.) by a single electron transfer (SET) to an oxidizing agent or electron acceptor to generate Rf—SO$_2$. following SO$_2$-elimination. Thus, the sulfinated compounds may act as an initiator in radical polymerization reactions and theoretically be consumed and incorporated into the polymer chain during the polymerization. Although not wanting to be bound by theory, it is also believed that because of the fast SET reaction of the fluorinated sulfinate anion with a strong oxidizing agent or a strong electron acceptor, such as (NH$_4$)$_2$S$_2$O$_8$ to form a fluorinated radical, polymers made using these initiator compounds may have reduced or no polar end-groups generated from the oxidizing agent, which may aid in stability of the resulting polymer. The application of the combined fluorinated sulfinate with an oxidation agent as co-initiator has been demonstrated, such as in U.S. Pat. No. 5,285,002 (Grootaert).

The sulfinate-containing molecules as disclosed herein may also impart branching of the polymer during polymerization. In one embodiment, the sulfinate-containing molecule of Formula (I) comprises both a double bond and a sulfinate functional group, both of which can react under free radical polymerization, the vinyl group acting as any traditional vinyl group would react and the sulfinate group as described above. In another embodiment, the sulfinate-containing molecule (e.g., an oligomer) of Formula (II) comprises multiple sulfinate residues, each of which is capable of forming a branch chain after generating the radical species.

The level of branching or non-linearity can be characterized through the long chain branching index (LCBI). The LCBI can be determined as described in R. N. Shroff, H. Mavridis; *Macromol.*, 32, 8464-8464 (1999) & 34, 7362-7367 (2001) according to the equation:

$$LCBI = \frac{\eta_{0,br.}^{1/a}}{[\eta]_{br.}} \cdot \frac{1}{k^{1/a}} - 1 \qquad \text{eq. 1}$$

In the above equation, $\eta_{0,br}$ is the zero shear viscosity (units Pa's) of the branched polymer measured at a temperature T and $[\eta]_{br}$ is the intrinsic viscosity (units ml/g) of the branched polymer at a temperature T' in a solvent in which the branched polymer can be dissolved and a and k are constants. These constants are determined from the following equation:

$$\eta_{0,lin} = k \cdot [\eta]_{lin}^a. \qquad \text{eq. 2}$$

wherein $\eta_{0,lin}$ and $[\eta]_{lin}$ represent respectively the zero shear viscosity and intrinsic viscosity of the corresponding linear polymer measured at the respective same temperatures T and T' and in the same solvent. Thus, the LCBI is independent of the selection of the measurement temperatures and solvent chosen provided of course that the same solvent and temperatures are used in equations 1 and 2.

Generally, the effectiveness of the fluorine-containing polymer to decrease melt defects will increase with an increasing value of the LCBI for polymers having similar zero shear rate viscosities ($\eta_0$). However, when the level of branching becomes too large, the polymer may have a gel fraction that cannot be dissolved in an organic solvent and the LCBI value cannot be measured accurately since the measurement is based on a soluble solution. At such high levels of branching, the advantageous effects of the fluorine-containing polymer on the processing of the melt-processible polymer composition are reduced as the melt viscosity of the fluoropolymer is too high. One skilled in the art through routine experimentation may readily determine the appropriate value of LCBI. Generally, the LCBI will be between 0.2 and 5, preferably between 0.5 and 1.5. In one embodiment, the LCBI is greater than 0.2, 0.5, 1, 1.5, 2, 2.5, 4, or even 6.

In one embodiment of the present disclosure, the fluorine-containing polymer of the present disclosure comprise a higher LCBI value, than the same polymer prepared with an alternate branching agent, such as a halogenated olefin.

The moieties of $X_1$, $X_2$, and $X_3$ and R and the selection of the monomer will determine the fluorination (i.e., perfluorinated or partially fluorinated) of the fluorine-containing polymer. In one embodiment, the fluorine-containing polymer of the present disclosure are perfluorinated. In other words, all of the C—H bonds in the polymer are replaced by C—F bonds, although the end groups may or may not be fluorinated. In one embodiment, the polymers of the present disclosure are highly fluorinated, meaning that 80%, 90%, 95%, or even 99% of the C—H bonds in the polymer are replaced by C—F bonds. In another embodiment, the polymers of the present disclosure are partially fluorinated, meaning the polymer (excluding the end groups) comprises a least one C—H bond.

The resulting fluorine-containing polymers of the present disclosure may be amorphous, i.e., they have no melting point or hardly show a melting point; semicrystalline, i.e., polymers that have a clearly detectable melting point; or even crystalline.

The fluorine-containing polymers of the present disclosure are melt-processible. This means the fluorine-containing polymers have an appropriate melt-viscosity that they can be melt-extruded at the temperatures applied for melt-processing the non-fluorinated polymers. Melt processing typically is performed at a temperature from 180° C. to 280° C., although optimum operating temperatures are selected depending upon the melting point, melt viscosity, and thermal stability of the polymer and also the type of extruder used.

The sulfinate-containing molecules should generally be used at fairly low levels to avoid extensive branching during the polymerization. The amount of sulfinate-containing molecules that is typically used in the polymerization to cause a desired amount of branching of the fluorine-containing polymer depends on the sulfinate-containing molecule used and on the polymerization conditions such as e.g., reaction time, temperature, and timing of the addition of the sulfinate-containing molecule. The amount of sulfinate-containing molecule to be used is selected such that the desired LCBI value is attained. The optimal amount of sulfinate-containing molecules can be readily determined by one skilled in the art, but is generally not more than 4% by weight. In one embodiment, at least 0.05, 0.1, 0.2, 0.3, 0.4, or even 0.5; and not more than 2, 2.5, 3, 3.5, 4, 4.5, or even 5% by weight used based on the total weight of monomers fed to the polymerization.

Preparation of the Fluorine-Containing Polymer

The fluorine-containing polymers can be obtained with any of the known polymerization techniques including solution polymerization, suspension polymerization and polymerization in super critical $CO_2$. The polymers are preferably made through an aqueous emulsion polymerization process, which can be conducted in a known manner including batch, semi-batch, or continuous polymerization techniques. The reactor vessel for use in the aqueous emulsion polymerization process is typically a pressurizable vessel capable of withstanding the internal pressures during the polymerization reaction. Typically, the reaction vessel will include a mechanical agitator, which will produce thorough mixing of the reactor contents and heat exchange system.

Any quantity of the monomer(s) and the sulfinate-containing molecules may be charged to the reactor vessel. The monomers and/or the sulfinate-containing molecules may be charged batchwise or in a continuous or semicontinuous manner. By semi-continuous is meant that a plurality of batches of the monomer and/or and the sulfinate-containing molecules are charged to the vessel during the course of the polymerization. The independent rate at which the monomers and/or the sulfinate-containing molecules are added to the kettle, will depend on the consumption rate with time of the particular monomer and/or the sulfinate-containing molecule. Preferably, the rate of addition of monomer and/or the sulfinate-containing molecules will equal the rate of consumption of monomer, i.e., conversion of monomer into polymer, and/or the sulfinate-containing molecules.

The reaction kettle is charged with water. To the aqueous phase there is generally also added a fluorinated surfactant, typically a non-telogenic fluorinated surfactant although aqueous emulsion polymerization without the addition of fluorinated surfactant may also be practiced. When used, the fluorinated surfactant is typically used in amount of 0.01% by weight to 1% by weight. Suitable fluorinated surfactants include any fluorinated surfactant commonly employed in aqueous emulsion polymerization. Particularly preferred fluorinated surfactants are those that correspond to the general formula:

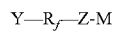

wherein Y represents hydrogen, Cl or F; $R_f$ represents a linear or branched perfluorinated alkylene having 4 to 10 carbon atoms; Z represents $COO^-$ or $SO_3^-$ and M represents an alkali metal ion or an ammonium ion. Exemplary emulsifiers include: ammonium salts of perfluorinated alkanoic acids, such as perfluorooctanoic acid and perfluorooctane sulphonic acid.

Also contemplated for use in the preparation of the polymers described herein are emulsifiers of the general formula:

wherein L represents a linear partially or fully fluorinated alkylene group or an aliphatic hydrocarbon group, $R_f$ represents a linear partially or fully fluorinated aliphatic group or a linear partially or fully fluorinated group interrupted with one or more oxygen atoms, $X_i^+$ represents a cation having the valence i and i is 1, 2 and 3. Specific examples are described in, for example, US Pat. Publ. 2007/0015937 (Hintzer et al.). Exemplary emulsifiers include: $CF_3CF_2OCF_2CF_2OCF_2COOH$, $CHF_2(CF_2)_5COOH$, $CF_3(CF_2)_6COOH$, $CF_3O(CF_2)_3OCF(CF_3)COOH$, $CF_3CF_2CH_2OCF_2CH_2OCF_2COOH$, $CF_3O(CF_2)_3OCHFCF_2COOH$, $CF_3O(CF_2)_3OCF_2COOH$, $CF_3(CF_2)_3(CH_2CF_2)_2CF_2CF_2CF_2COOH$, $CF_3(CF_2)_2CH_2(CF_2)_2COOH$, $CF_3(CF_2)_2COOH$, $CF_3(CF_2)_2(OCF(CF_3)CF_2)OCF(CF_3)COOH$, $CF_3(CF_2)_2(OCF_2CF_2)_4OCF(CF_3)COOH$, $CF_3CF_2O(CF_2CF_2O)_3CF_2COOH$, and their salts. In one embodiment, the molecular weight of the emulsifier is less than 1500, 1000, or even 500 grams/mole.

These emulsifiers may be used alone or in combination as a mixture of two or more of them. The amount of the emulsifier is well below the critical micelle concentration, generally within a range of from 250 to 5,000 ppm (parts per million), preferably 250 to 2000 ppm, more preferably 300 to 1000 ppm, based on the mass of water to be used.

A chain transfer agent may be used to control the molecular weight of the polymer so as to obtain the desired zero shear rate viscosity. Useful chain transfer agents include $C_2$-$C_6$ hydrocarbons such as ethane, alcohols, ethers, esters including aliphatic carboxylic acid esters and malonic esters, ketones and halocarbons. Particularly useful chain transfer agents are dialkylethers such as dimethyl ether and methyl tertiary butyl ether.

In one embodiment, the polymerization is initiated after an initial charge of the monomer and/or the sulfinate-containing molecule by adding an initiator or initiator system to the aqueous phase. For example, peroxides can be used as free radical initiators. Specific examples of peroxide initiators include, hydrogen peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble per-acids and water soluble salts thereof such as e.g. ammonium, sodium or potassium salts. Examples of per-acids include peracetic acid. Esters of the peracid can be used as well and examples thereof include tert-butylperoxyacetate and tert-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate or a combination of peroxodisulphate and hydrazine. Exemplary persulphates include: sodium peroxodisulphates, potassium peroxodisulphates, ammonium peroxodisulphates.

In yet another embodiment, a second fluoroalkyl sulfinates can be used in conjection with oxidizing agents to initiate the polymerization. Exemplary second fluoroalkyl sulfinates include: $C_4F_9SO_2M$, wherein M is a cation. Further initiators that can be used are ammonium-alkali- or earth alkali salts of persulfates, permanganic or manganic acid or manganic acids. The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization until a conversion of 70 to 80%. One can also add part of the initiator at the start and the remainder in one or separate additional portions during the polymerization. Accelerators such as for example water-soluble salts of iron, copper and silver may also be added.

During the initiation of the polymerization reaction, the sealed reactor kettle and its contents are conveniently preheated to the reaction temperature. Polymerization temperatures are from 20° C. to 150° C., preferred from 30° C. to 110° C. and most preferred from 40° C. to 100° C. The polymerization pressure is typically between 4 and 30 bar, in particular 8 to 20 bar. The aqueous emulsion polymerization system may further comprise auxiliaries, such as buffers and complex-formers.

The amount of polymer solids that can be obtained at the end of the polymerization is typically between 10% and 45% by weight, preferably between 20% and 40% by weight and the average particle size of the resulting fluoropolymer is typically between 50 nm and 500 nm. During work-up these particles sizes may be further increased to the final particle sizes by standard techniques (such as, e.g., agglomeration or melt-pelletizing).

In one embodiment, the polymer comprises an end-group according to formulas III and IV may be obtained, wherein the end-group has a structures of:

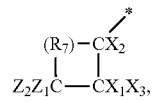

Formula (III)

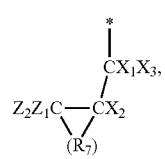

Formula (IV)

and combinations thereof;
wherein $X_1$, $X_2$, and $X_3$ are each independently selected from H, F, Cl, a $C_1$ to $C_4$ alkyl group, and a $C_1$ to $C_4$ fluorinated alkyl group; and $Z_1$ and $Z_2$ are independently selected from F, $CF_3$, and a perfluoroalkyl group. $R_7$ is a linking group that can be a linear or branched, cyclic or acyclic structure, that may be saturated or unsaturated, substituted or unsubstituted, and optionally contains one or more hetero-atoms selected from the group consisting of sulfur, oxygen, and nitrogen, and/or optionally contains one or more functional groups selected from the group consisting of ester, amide, sulfonamide, carbonyl, carbonate, urethane, urea, and carbamate. $R_7$ comprises at least 2 or more catenary atoms so that at a minimum a 5-membered ring is achieved. As used herein the asterisk (*) is used to designate a polymer chain.

In one embodiment, these end-groups of Formula (III) and/or (IV) can originate from the intramolecular cyclization of the sulfinate-containing molecule, for example the vinyl sulfinated monomers of Formula (I).

Exemplary endgroups include:

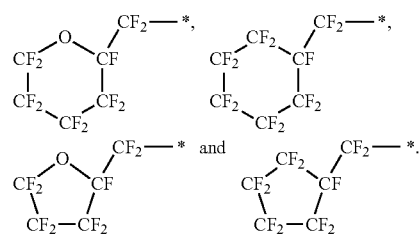

However, other end-groups derived from the sulfinate-containing molecule may be contemplated. See PCT Pub. No. WO 2012/083107 (filed 16 Dec. 2011, herein incorporated by reference).

In one embodiment, the polymer comprising an end-group according to formulas III and IV may further comprise interpolymerized units of a monomer. Such monomers may be selected from: dienes (including nonfluoriated, partially fluorinated and perfluorinated dienes, for example $CH_2=CHR_fCH=CH_2$, wherein Rf is a perfluorinated alkylene group, which may comprise 2, 3, 4, 5, 6, 7, 8, 9, 10, 11, 12 carbon atoms for example), halogenated alkenes, a fluoroalkyl substituted ethylene, allyl iodide, fluorinated alkyl vinyl ethers, fluorinated alkoxy vinyl ethers, olefins, acrylates, styrene, vinyl ethers, and combinations thereof.

Exemplary monomers include: tetrafluoroethylene, hexafluoropropylene, trifluoroethylene, vinylidene fluoride, vinyl fluoride, bromotrifluoroethylene, chlorotrifluoroethylene, $CF_3CH=CF_2$, $C_4F_9CH=CH_2$, $CF_2=CHBr$, $CH_2=CHCH_2Br$, $CF_2=CFCF_2Br$, $CH_2=CHCF_2CF_2Br$, $CH_2=CHI$, $CF_2=CHI$, $CF_2=CFI$, $CH_2=CHCH_2I$, $CF_2=CFCF_2I$, $CH_2=CHCF_2CF_2I$, $CF_2=CFCH_2CH_2I$, $CF_2=CFCF_2CF_2I$, $CH_2=CH(CF_2)_6CH_2CH_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF2=CFO(CF2)3-OCF2CF2$, $CH2=CHBr$ and others as is known in the art.

Fluorine-Containing Polymer Compositions

The fluorine-containing polymers provided herein may be used as processing aids for facilitating or improving the quality of the extrusion of non-fluorinated polymers. They can be mixed with non-fluorinated polymers during extrusion into polymer articles. They can also be provided as polymer compositions, so-called masterbatches, which may contain further components and/or one or more host polymers. Typically master batches contain the fluorine-containing polymer dispersed in or blended with a host polymer, which typically is a non-fluorinated polymer. Masterbatches may also contain further ingredients, such as synergists, lubricants, etc. The masterbatch may be a composition ready to be added to a non-fluorinated polymer for being extruded into a polymer article. The materbatch may also be a composition that is ready for being directly processed into a polymer articles without any further addition of non-fluorinated polymer.

The fluorine-containing polymer can be melt-processed (e.g., melt extruded) at the temperatures applied. Melt-processing typically is performed at temperatures from 180° C. to 280° C., although optimum operating temperatures are selected depending upon the melting point, melt viscosity, and thermal stability of the composition and also the type of melt-processing equipment used. Generally, the composition may have a melt-flow index (measured according to ASTM D1238 at 190° C., using 2160 g weight) of 5.0 g/10 minutes or less, preferably 2.0 g/10 minutes or less. Generally the melt flow indexes are greater than 0.1 or greater than 0.2 g/10 min.

Such composition may be further mixed with further non-fluorinated polymer and/or further components to obtain a composition ready for processing into a polymer article. The composition may also contain all required ingredients and are ready for being extruded into a polymer article. The amount of the fluorine-containing polymer in these compositions is typically relatively low. The exact amount used may be varied depending upon whether the extrudable composition is to be extruded into its final form (e.g. a film) or whether it is to be used as a master batch or processing additive which is to be (further) diluted with additional host polymer before being extruded into its final form.

Generally, the fluorine-containing polymer composition comprises from about 0.002 to 50 weight % of the fluorine-containing polymer. If the fluorine-containing polymer composition is a master batch or processing additive, the amount of fluoropolymer may vary between about 1 to 50 weight % of the composition. If the fluorine-containing polymer composition is to be extruded into final form and is not further diluted by the addition of host polymer, it typically contains a lower concentration of the fluorine-containing polymer, e.g., about 0.002 to 2 wt %, and preferably about 0.005 ns 0.2 wt % of the fluorine-containing polymer composition. In any event, the upper concentration of the fluorine-containing polymer used is generally determined by economic limitations rather than by adverse physical effects of the concentration of the fluorine-containing polymer composition.

In one embodiment, the composition may comprise blends of fluorine-containing polymers which comprise different MFIs, Mooney viscosity, and/or LCBIs. See for example, U.S. Pat. No. 6,277,919 (Dillon et al.).

In another embodiment the composition may comprise a second polymer processing additive as is known in the art, such as a fluoropolymer obtained from a bisolefin, a fluoropolymer obtained from a halogenated olefin, siloxanes, etc.

The fluorine-containing polymer composition may be used in the form of a powder, pellet, granule of a desired particulate size or size distribution, or any other extrudable form.

The fluorine-containing polymer compositions may comprise fluorine-containing polymers having average particle sizes (weight average) of greater than about 50 nm, or greater than about 500 nm or greater than about 2 μm or even greater than about 10 μm. In a typical embodiment, the fluorine-containing polymer may have an average particle size (weight average) of from about 1 to about 30 μm.

Non-Fluorinated Polymers (Host Polymers)

A wide variety of non-fluorinated polymers are useful as host polymers. The non-fluorinated melt processible polymers may be selected from a variety of polymer types. Host polymers include, but are not limited to, hydrocarbon resins, polyamides (including but not limited to nylon 6, nylon 6/6, nylon 6/10, nylon 11 and nylon 12), polyester (including but not limited to poly (ethylene terephthalate) and poly (butylene terephthalate)), chlorinated polyethylene, polyvinyl resins such as polyvinylchoride, polyacrylates and polymethylacrylates, polycarbonates, polyketones, polyureas, polyimides, polyurethanes, polyolefins and polystyrenes.

The non-fluorinated polymers host polymers are melt-processible. Typically, the polymers, including hydrocarbon polymers, have melt flow indexes (measured according to ASTM D1238 at 190° C., using a 2160 g weight) of 5.0 g/10 minutes or less, preferably 2.0 g/10 minutes. Generally the melt flow indexes are greater than 0.1 or 0.2 g/10 min.

A particularly useful class of host polymers are hydrocarbon polymers, in particular, polyolefins. Representative examples of useful polyolefins are polyethylene, polypropylene, poly (1-butene), poly (3-methylbutene), poly (4-methylpentene) and copolymers of ethylene with propylene, 1-butene, 1-hexene, 1-octene, 1-decene, 4-methyl-1-pentene, and 1-octadecene.

Representative blends of useful polyolefins include blends of polyethylene and polypropylene, linear or branched low-density polyethylenes (e.g. those having a density of from 0.89 to 0.94 g/cm³), high-density polyethylenes (metallocene-catalyzed or not metallocene-catalyzed), including those having a density of e.g. from 0.94 to about 0.98 g/cm³, and polyethylene and olefin copolymers containing said copolymerizable monomers, some of which are described below, e. g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers; and ethylene, acrylic acid, and vinyl acetate copolymers.

The polyolefins may be obtained by the homopolymerization or copolymerization of olefins, as well as copolymers of one or more olefins and up to about 30 weight percent or more, but preferably 20 weight percent or less, of one or more monomers that are copolymerizable with such olefins, e. g. vinyl ester compounds such as vinyl acetate. The olefins may be characterized by the general structure $CH_2=CHR$, wherein R is a hydrogen or an alkyl radical, and generally, the alkyl radical contains not more than 10 carbon atoms, preferably from one to six carbon atoms. Representative olefins are ethylene, propylene, 1-butene, 1-hexene, 4-methyl-1-pentene, and 1-octene. Representative monomers that are copolymerizable with the olefins include: vinyl ester monomers such as vinyl acetate, vinyl propionate, vinyl butyrate, vinyl chloroacetate, and vinyl chloropropionate; acrylic and alpha-alkyl acrylic acid monomers and their alkyl esters, amides, and nitriles such as acrylic acid, methacrylic acid, ethacrylic acid, methyl acrylate, ethyl acrylate, N,N-dimethyl acrylamide, methacrylamide, and acrylonitrile; vinyl aryl monomers such as styrene, o-methoxystyrene, p-methoxystyrene, and vinyl naphthalene; vinyl and vinylidene halide monomers such as vinyl chloride, vinylidene chloride, and vinylidene bromide; alkyl ester monomers of maleic and fumaric acid and anhydrides thereof such as dimethyl maleate, diethyl maleate, and maleic anhydride; vinyl alkyl ether monomers such as vinyl methyl ether, vinyl ethyl ether, vinyl isobutyl ether, and 2-chloroethyl vinyl ether; vinyl pyridine monomers; N-vinyl carbazole monomers; and N-vinyl pyrolidine monomers.

Useful host polymers also include the metallic salts of the olefin copolymers, or blends thereof, that contain free carboxylic acid groups. Illustrative of the metals that can be used to provide the salts of said carboxylic acids polymers are the one, two, and three valence metals such as sodium, lithium, potassium, calcium, magnesium, aluminum, barium, zinc, zirconium, beryllium, iron, nickel, and cobalt.

Useful host polymers also include blends of various thermoplastic polymers and blends thereof containing conventional adjuvants such as antioxidants, light stabilizers, fillers, antiblocking agents, and pigments.

The host polymers may be used in the form of powders, pellets, granules, or in any other extrudable form. The most preferred olefin polymers useful in the invention are hydrocarbon polymers such as homopolymers of ethylene and propylene or copolymers of ethylene and 1-butene, 1-hexene, 1-octene, 4-methyl-1-pentene, propylene, vinyl acetate and methyl acrylate. The melt processable composition of the present disclosure can be prepared by any of a variety of ways. For example, the host polymer and the fluorine-containing polymer can be combined together by any of the blending means usually employed in the plastics industry, such as with a compounding mill, a Banbury mixer, or a mixing extruder in which the fluoropolymer is uniformly distributed throughout the host polymer. The fluorine-containing polymer and the host polymer may be used in the form, for example, of a powder, a pellet, or a granular product. The mixing operation is most conveniently carried out at a temperature above the melting point or softening point of the fluoropolymer, though it is also feasible to dry-blend the components in the solid state as particulates and then cause uniform distribution of the components by feeding the dry blend to a twin-screw melt extruder.

The resulting melt-blended mixture can be pelletized or otherwise comminuted into a desired particulate size or size distribution and fed to an extruder, which typically will be a single-screw extruder, that melt-processes the blended mixture. Melt-processing typically is performed at a temperature from 180° C. to 280° C., although optimum operating temperatures are selected depending upon the melting point, melt viscosity, and thermal stability of the blend. Different types of extruders that may be used to extrude the compositions of this invention are described, for example, by Rauwendaal, C., "Polymer Extrusion", Hansen Publishers, p. 23-48, 1986. The die design of an extruder can vary, depending on the desired extrudate to be fabricated. For example, an annular die can be used to extrude tubing, useful in making fuel line hose, such as that described in U.S. Pat. No. 5,284,184 (Noone et al.), which description is incorporated herein by reference.

The blended composition can contain conventional adjuvants such as antioxidants, antiblocks, pigments, and fillers, e. g. titanium dioxide, carbon black, and silica.

Antiblocks, when used, may be coated or uncoated materials. In one embodiment, a synergist is added to the melt-processable composition. By 'synergist' is meant a compound, generally non-fluorinated organic compound, that allows the use of a lower amount of the fluorine-containing polymer while achieving essentially the same improvement in extrusion and processing properties of the non-fluorinated polymer as if a higher amount of the fluorine-containing polymer was used.

Exemplary synergists include: polyethylene glycol, polycaprolactone, silicone-polyethers, aliphatoic polyesters, aromatice polyesters, amine oxides, carboxylic acids, fatty acid esters, and combinations thereof.

The fluorine-containing polymer may also be combined with a poly (oxyalkylene) polymer component as a so-called synergist. The poly (oxyalkylene) polymer component may comprise one or more poly (oxyalkylene) polymers. A useful processing additive composition comprises between about 5 and 95 weight percent of the poly (oxyalkylene) polymer component and 95 and 5 weight percent of the fluorine-containing polymer. Typically, the ratio of the fluorine-containing polymer to the poly (oxyalkylene) polymer component in the processing aid will be from 1/2 to 2/1.

The poly (oxyalkylene) polymer component generally may comprise between about 0.002 and 20 weight percent of the overall melt processable composition, more preferably between about 0.005 and 5 weight percent, and most preferably between about 0.01 and 1 weight percent. Generally, poly (oxyalkylene) polymers useful in this invention include poly (oxyalkylene) polyols and their derivatives. A class of such poly (oxyalkylene) polymers may be represented by the general formula:

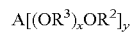

wherein: A is an active hydrogen-free residue of a low molecular weight, initiator organic compound having a plurality of active hydrogen atoms (e.g, 2 or 3), such as a polyhydroxyalkane or a polyether polyol, e. g., ethylene glycol, glycerol, 1,1,1-trimethylol propane, and poly (oxypropylene) glycol; y is 2 or 3; $(OR^3)_x$ is a poly (oxyalkylene) chain having a plurality of oxyalkylene groups, $OR^3$ wherein the $R^3$ moieties can be the same or different and are selected from the group consisting of $C_1$ to $C_5$ alkylene radicals and, preferably, $C_2$ or $C_3$ alkylene radicals, and x is the number of oxyalkylene units in said chain. Said poly (oxyalkylene) chain can be a homopolymer chain, e. g., poly (oxyethylene) or poly (oxypropylene), or can be a chain of randomly distributed (i. e., a heteric mixture) oxyalkylene groups, e. g., a copolymer $—OC_2H_4—$ and $—OC_3H_6—$ units, or can be a chain having alternating blocks or backbone segments of repeating oxyalkylene groups, e. g., a polymer comprising $(—OC_2H_4—)_a$ and $(—OC_3H_6—)_b$ blocks, wherein a+b=5 to 5000 or higher, and preferably 10 to 500.

$R_2$ is H or an organic radical, such as alkyl, aryl, or a combination thereof such as aralkyl or alkaryl, and may contain oxygen or nitrogen heteroatoms. For example, $R_2$ can be methyl, butyl, phenyl, benzyl, and acyl groups such as acetyl, benzoyl and stearyl.

Representative poly (oxyalkylene) polymer derivatives can include poly (oxyalkylene) polyol derivatives wherein the terminal hydroxy groups have been partly or fully converted to ether derivatives, e. g., methoxy groups, or ester derivatives, e. g., stearate groups. Other useful poly (oxyalkylene) derivatives are polyesters, e. g., prepared from dicarboxylic acids and poly (oxyalkylene) glycols. Preferably, the major proportion of the poly (oxyalkylene) polymer derivative by weight will be the repeating oxyalkylene groups, $(OR_3)$.

The poly (oxyalkylene) polyols and their derivatives can be those which are solid at room temperature and have a molecular weight of at least about 200 and preferably a molecular weight of about 400 to 20,000 or higher. Poly (oxyalkylene) polyols useful in this invention include polyethylene glycols which can be represented by the formula $H(OC_2H_4)_nOH$, where n is about 15 to 3000, such as those sold under the trade designation "CARBOWAX", such as "CARBOWAX PEG8000", where n is about 180, e.g. 181, and those sold under the trade name "POLYOX", such as "POLYOX WSR N-10" where n is about 2300, e.g. 2272.

As an alternative to or in combination with a poly (alkyleneoxy) polymer, there can also be used any of the following polymers as synergists: i) silicone-polyether copolymers; ii) aliphatic polyesters such as poly (butylene adipate), poly (lactic acid) and polycaprolactone polyesters and iii) aromatic polyesters such as phthalic acid diisobutyl ester.

A preferred aliphatic polyester is a polycaprolactone having a number average molecular weight in the range 1000 to 32000, preferably 2000 to 10000, and most preferably 2000 to 4000.

The melt-processable compositions of the present disclosure may be used in articles. In one embodiment, the fluorine-containing polymer composition is useful in the extrusion of non-fluorinated polymers, which includes for example, extrusion of films, extrusion blow molding, injection molding, pipe, wire and cable extrusion, and fiber production.

Exemplary embodiments of the present disclosure include:

Item 1. A melt-processable polymer composition comprising: a non-fluorinated melt-processable polymer; and a fluorine-containing polymer derived from the polymerization of a monomer and a sulfinate-containing molecule, wherein the sulfinate-containing molecule is selected from:

(a) $CX_1X_3=CX_2-(R)_p-CZ_1Z_2-SO_2M$  Formula (I)

(b)

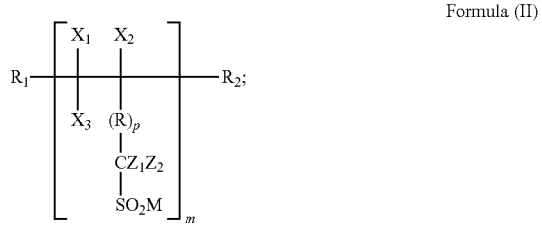

Formula (II)

and (c) combinations thereof, wherein $X_1$, $X_2$, and $X_3$ are each independently selected from H, F, Cl, a $C_1$ to $C_4$ alkyl group, and a $C_1$ to $C_4$ fluorinated alkyl group; R is a linking group; $Z_1$ and $Z_2$ are independently selected from F, $CF_3$, and a perfluoroalkyl group; $R_1$ and $R_2$ are end-groups; p is 0 or 1; m is at least 2; and M is a cation.

Item 2. The melt-processable polymer composition of item 1, wherein the sulfinate-containing molecule of Formula (I) is selected from: $CF_2=CF-O(CF_2)_n-SO_2M$; $CH_2=CH-(CF_2)_n-SO_2M$; $CF_2=CF-O[CF_2CF(CF_3)O]_n(CF_2)_o-SO_2M$; and combinations thereof, where n is at least 1, o is at least 1, and M is a cation.

Item 3. The melt-processable polymer composition of any one of the previous items, wherein the sulfinate-containing molecule of Formula (II) comprises a segment selected from:

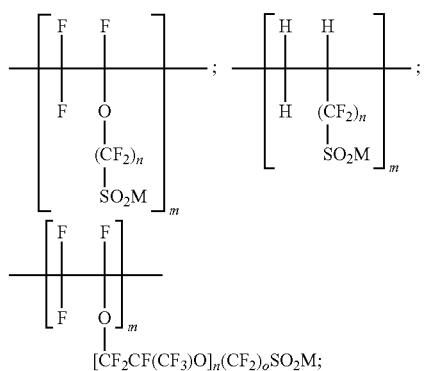

and combinations thereof, where n is at least 1, o is at least 1, and m is at least 1.

Item 4. The melt-processable polymer composition of any one of the previous items, wherein the fluorine-containing polymer is further derived from a second fluoroalkyl sulfinate initiator.

Item 5. The melt-processable polymer composition of item 4, wherein the second fluoroalkyl sulfinate initiator is $C_4F_9SO_2M$, wherein M is a cation.

Item 6. The melt-processable polymer composition of any one of the previous items, wherein the monomer is selected from dienes, halogenated alkenes, a fluoroalkyl substituted ethylene, allyl iodide, fluorinated alkyl vinyl ethers, fluorinated alkoxy vinyl ethers, olefins, acrylates, styrene, vinyl ethers, and combinations thereof.

Item 7. The melt-processable polymer composition of any one of the previous items, wherein the monomer is selected from: tetrafluoroethylene, hexafluoropropylene, trifluoroethylene vinylidene fluoride, vinyl fluoride, bromotrifluoroethylene, chlorotrifluoroethylene, $CF_3CH=CF_2$, $C_4F_9CH=CH_2$, $CF_2=CHBr$, $CH_2=CHCH_2Br$, $CF_2=CFCF_2Br$, $CH_2=CHCF_2CF_2Br$, and combinations thereof.

Item 8. The melt-processable polymer composition of any one of the previous items, wherein the fluorine-containing polymer is crystalline.

Item 9. The melt-processable polymer composition of any one of items 1-7, wherein the fluorine-containing polymer is semi-crystalline, or amorphous.

Item 10. The melt-processable polymer composition of any one of the previous items, wherein the fluorine-containing polymer is partially fluorinated.

Item 11. The melt-processable polymer composition of any one of items 1-9, wherein the fluorine-containing polymer is fully fluorinated.

Item 12. The melt-processable polymer composition of any one of the previous items, wherein the fluorine-containing polymer has an LCBI of greater than 0.2.

Item 13. A melt-processable polymer composition comprising: a non-fluorinated melt-processable polymer; and a polymer comprising an end-group having a structures selected from:

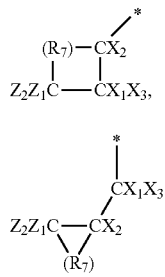

Formula (III)

Formula (IV)

and combinations thereof;
wherein $X_1$, $X_2$, and $X_3$ are each independently selected from H, F, Cl, a $C_1$ to $C_4$ alkyl group, and a $C_1$ to $C_4$ fluorinated alkyl group; $R_7$ is a linking group comprising at least 2 or more catenary atoms; and $Z_1$ and $Z_2$ are independently selected from F, $CF_3$, and a perfluoroalkyl group.

Item 14. The melt-processable polymer composition of item 13, wherein the end-group is selected from:

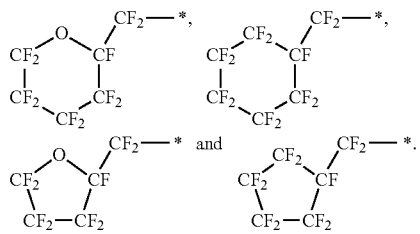

Item 15. The melt-processable polymer composition of any one of items 13 to 14, further comprising interpolymerized units of a monomer, wherein the monomer is selected from: dienes, halogenated alkenes, a fluoroalkyl substituted ethylene, allyl iodide, fluorinated alkyl vinyl ethers, fluorinated alkoxy vinyl ethers, olefins, acrylates, styrene, vinyl ethers, and combinations thereof.

Item 16. The melt-processable polymer composition of item 15, wherein the monomer is selected from: tetrafluoroethylene, hexafluoropropylene, trifluoroethylene, vinylidene fluoride, vinyl fluoride, bromotrifluoroethylene, chlorotrifluoroethylene, $CF_3CH=CF_2$, $C_4F_9CH=CH_2$, $CF_2=CHBr$, $CH_2=CHCH_2Br$, $CF_2=CFCF_2Br$, $CH_2=CHCF_2CF_2Br$, and combinations thereof.

Item 17. The melt-processable polymer composition of any one of the previous items, further comprising a synergist.

Item 18. The melt-processable polymer composition of item 14, wherein the synergist is polyethylene glycol or polycaprolactone.

Item 19. An article comprising the melt-processable polymer composition of any one of the previous items.

Item 20. A polymer melt additive composition for use as a processing aid in the extrusion of a non-fluorinated polymer, the polymer melt additive composition comprising a fluorine-containing polymer derived from the polymerization of a monomer and a sulfinate-containing molecule, wherein the sulfinate-containing molecule is selected from:

(a) $CX_1X_3=CX_2—(R)_p—CZ_1Z_2—SO_2M$  Formula (I)

(b)

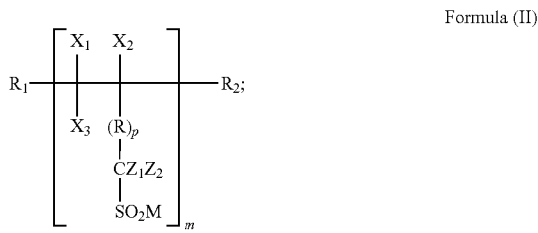

Formula (II)

and
(c) combinations thereof,
wherein $X_1$, $X_2$, and $X_3$ are each independently selected from H, F, Cl, a $C_1$ to $C_4$ alkyl group, and a $C_1$ to $C_4$ fluorinated alkyl group; R is a linking group; $Z_1$ and $Z_2$ are independently selected from F, $CF_3$, and a perfluoroalkyl group; $R_1$ and $R_2$ are end-groups; p is 0 or 1; m is at least 2; and M is a cation.

Item 21. The polymer melt additive composition of item 20, wherein the polymer melt additive composition when extruded with a non-fluorinated polymer, eliminates melt fracture in the non-fluorinated polymer at lower amounts than a comparative polymer melt additive composition derived from the fluorine-containing polymer that does not consist of the one or more modifiers.

Item 22. The polymer melt additive composition of any one of items 17-21, further comprising a synergist.

Item 23. The polymer melt additive composition of item 22, wherein the synergist is polyethylene glycol, polycaprolactone, or combinations thereof.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, hr=hour, kg=kilograms, min=minutes, cm=centimeter, mm=millimeter, ml=milliliter, dl=deciliter, l=liter, mol=moles, kPa=kilopascals, MPa=megapascals, FT-IR=Fouier Transform Infrared Spectroscopy, psi=pressure per square inch, [η]=intrinsic viscosity, rad/s=radians/sec SI unit of angular velocity, MV=Mooney Viscosity, MI=melt index in g/10 min @ 190° C. and 2.6 kg weight, and wt=weight, LCBI=Long Chain Branching Index.

Material Characterization

The Mooney viscosity was determined according to ASTM D1646-06 Part A "Rubber-Viscosity, Stress Relaxation, and Pre-vulcanization Characteristics [Mooney viscometer]" by a MV 2000 instrument (available from Alpha Technologies, Akron, Ohio) using large rotor (ML 1+10) at 121° C. Results are reported in Mooney units.

Solution viscosities of diluted polymer solutions were determined usually on a 0.25% wt (0.2 g/dl) polymer solution in methylethylketone (MEK) at 35° C. in accordance to ASTM D2857, and D 446. A Connon-Fenske-Routine-Viscosimeter (Fa. Schott, Mainz/Germany) was used for the measurements. The so-obtained inherent or reduced viscosities $\eta_{red}$ were converted into the intrinsic viscosity $[\eta]$ using the Huggins equation $\eta_{red}=[\eta]+k_H \times [\eta]^2 \times c$ and a Huggins constant of $k_H=0.34$. The intrinsic viscosity $[\eta]$ as well as the reduced viscosity. $\eta_{red}$ are reported in physical units of ml/g, the inherent viscosity (IV) is reported in physical units of dl/g.

The melt viscosity was measured using an AR2000ex parallel plate rheometer from TA instruments. It was fitted with Nickel plated 25 mm disposable plates mounted on an electrically heated plates system (EHP). The materials were pressed into a bubble free 1.25 mm sheet at 130° C. For each material, a 30 mm disc was cut out and placed between the rheometer plates at 150° C. The gap was set at 1.1 mm and the sample was trimmed after the normal force stabilized. The gap was then set to 1.0 mm and the measurement was initialized after the normal force stabilized.

The test procedure was a time and frequency sweep, with five points per decade, at frequencies ranging from 0.1 to 398.1 rad/s, and at six temperatures, ranging from 150° C. to 250° C., and a strain of 10%.

The $\eta'$ and $\eta^*$ data was fitted simultaneously to the combined Carreau-Yasuda model and Arrhenius equation, as described in U.S. Pat. No. 5,830,947 (Blong et al.), to obtain the zero shear viscosity.

The "Long Chain Branching Index" (LCBI) was calculated according to the method described in U.S. Pat. No. 7,375,157 (Amos et al.).

Blown Film Evaluation Method

For evaluation in a blown film line, concentrates of Polymer Processing Additive (PPA) were prepared at a level of 3% in a 2 MI Linear Low Density Polyethylene (LLDPE) which was stabilized with 1000 of antioxidant and 700 ppm of acid neutralizer. The concentrates were compounded using a "Haake Rheomix TW-100" counter-rotating, intermeshing, conical twin screw extruder (commercially available from Thermo Fischer Scientific, Waltham, Mass.). Prior to compounding, the resin, antioxidants and fluoropolymer additive were dry-blended in a bag. This powder blend was starve-fed to the compounder at a nominal rate of 3.3 kg/hr. The extruder was operating at 150 rpm, with an extrusion profile of 170° C./190° C./200° C. and die temp of 200° C. The extrudate was water quenched and the strand pelletized. The resulting pellets were collected in a plastic bag, hand mixed by shaking, and passed through the extruder a second time by flood feeding with a screw speed of 90 rpm to ensure adequate dispersion and distribution of the fluorine-containing polymer within the host resin.

Samples for extrusion were prepared by weighing the required amount of polymer processing additive concentrate, 0.9 MI LLDPE resin and other additive concentrates into a 5 gallon pail and mixing on a pail tumbler for a minimum of 10 min.

Films were produced using a Kiefel blown film line (commercially available from Riefenhäuser GmbH, Troisdorf, Germany) with a 40 mm, 24/1:L/D, grooved feed extruder. The die was of spiral design, with a diameter of 40 mm and a die gap of 0.9 mm. An adjustable single lip air ring with chilled air was used for cooling. An iris and sizing cage provided further bubble stability. Film was produced with a nominal gauge of 25 microns, with a lay flat width of approximately 22 cm.

The Kiefel temperature zones (two extruder, one adapter and three die zones) were set at 130° C. (feed), 195° C., 205° C., 210° C., 210° C., 210° C. respectively, where the die adapter zone was adjusted to maintain a target melt temperature of 210° C. The screw was maintained at about 35 rpm to deliver an output of about 10 kg/hr corresponding to a shear rate of about 220 s$^{-1}$.

Prior to each evaluation it was necessary to ensure that the blown film line was free of residual fluorine-containing polymer from the previous evaluation. This was accomplished by gently cleaning the die with a brass brush and pad sold under the trade designation "SCOTCH-BRITE" available from 3M Co., St. Paul, Minn. A 50/50 (by volume) blend of purge compound and 0.9 mi LLDPE (approximately 20 kg) was used to purge the extruder. The screw speed was gradually increased from 40 to 140 rpm, this was followed by 20 kg of 0.9 MI LLDPE, while maintaining the pressure below 5000 psi. The base resin was then extruded into film, under the original conditions for a minimum of 30 min, until the previously determined extrusion pressure was achieved and the resultant film was fully melt fractured.

The percent melt fracture was determined by taking a section of the film lay flat, opening it along the edge, measuring the individual bands (regions) of melt fracture in the transverse direction of the film, summing their total, and then dividing by the total width of the opened lay flat film.

MV4SO2H and MV4SO2NH4 Synthesis 50 g (0.13 mol) MV4S and 150 ml of reagent grade ethanol was added to a 1 liter 3-neck round bottom flask. The solution was stirred and cooled to 0° C. 3.4 g (0.09 mol) NaBH$_4$ was added in portions over 30 minutes with a 5° C. exothermic temperature rise per portion. The reaction was kept under 10° C. throughout the addition of NaBH$_4$. The flask was allowed to warm to 20° C. and the slurry was stirred for 30 minutes. 26 g concentrated H$_2$SO$_4$ in 200 g water was added slowly resulting in a temperature rise to 32° C. A lower fluorochemical phase of 31 g of unreacted MV4S was recovered. The clear top solution was extracted with 110 g methyl-t-butyl ether (MTBE) and vacuum stripped to recover 28 g of a semi-solid material. The semi-solid material still contained some water, ethanol, and salts. NMR gave the desired MV4SO$_2$H in an 86% yield based on reacted MV4S. The ammonium salt was made by titration with ammonium hydroxide.

Synthesis of PPA1

An 80 l reactor was charged with 52 kg water, 112 g ammonium persulfate (APS, (NH$_4$)$_2$S$_2$O$_8$), 206 g 50% aqueous solution of potassium phosphate dibasic (K$_2$HPO$_4$) and 36.8 g diethylmalonate. The reactor was evacuated, the vacuum was broken and it was pressurized with nitrogen to 0.17 MPa. This vacuum and pressurization was repeated three times. After removing oxygen, the reactor was heated to 71.1° C. and the vacuum was broken and then pressurized with hexafluoropropylene (HFP) to 0.28 MPa. The reactor was then charged with vinylidene fluoride (VDF) and hexafluoropropylene (HFP), bringing reactor pressure to 1.03 MPa. Total precharges of VDF and HFP was 675 g and 894 g, respectively. The reactor was agitated at 450 rpm. As reactor pressure dropped due to monomer consumption in the polymerization reaction. HFP and VDF was continuously fed to the reactor to maintain the pressure at 1.03 MPa.

The ratio of the blend to VDF was 0.651 by weight and no emulsifier was used for the polymerization. After 4 hrs the monomer and blend feeds were discontinued and the reactor was cooled. The resulting dispersion had a solid content of 30% by weight and a pH of 3.9. The dispersion particle size was 350 nm and total amount of dispersion was about 74.3 kg.

For the coagulation, 942 g of the latex made as described above was added to 2,320 mL of a 1.25% $MgCl_2$ by weight in water solution. The crumb was recovered by filtering the coagulate through cheese cloth and gently squeezing to remove excess water. The crumb was returned to the coagulation vessel and rinsed with deionized water a total of 3 times. After the final rinse and filtration, the crumb was dried in a 130° C. oven for 16 hrs. The resulting fluoropolymer raw gum had a Mooney viscosity of 70 at 121° C.

Synthesis of FKM4

A 4 liter reactor was charged with 2.25 kg water, 1.7 g diethyl malonate (DEM), an aqueous solution containing 5.2 g ammonium persulfate (APS, $(NH_4)_2S_2O_8$), and 5.0 g potassium phosphate dibasic ($K_2HPO_4$). Containers from which the solid reagents were added were rinsed, and the rinse water, totaling 350 g, was added to the reactor. The reactor was evacuated; the vacuum was broken and the vessel was pressurized with nitrogen to 25 psi (0.17 MPa). This evacuation and pressurization cycle was repeated three times. After removing oxygen, the reactor was heated to 73.3° C. and pressurized with 22 g hexafluoropropylene (HFP). The reactor was then charged with 139 g vinylidene fluoride (VDF) and 109 grams of hexafluoropropylene (HFP). The reactor was agitated at 650 rpm. As reactor pressure dropped due to monomer consumption in the polymerization reaction, HFP and VDF were continuously fed to the reactor to maintain the pressure at 160 psi (1.11 MPa). The ratio of HFP and VDF was 0.651 by weight. Concurrently, a 20% w/w solution of MV4SO2NH4 vinyl sulfinate monomer (ammonium salt) was fed continuously, such that 15 grams of monomer (75 g solution) was fed over the course of the polymerization. After 750 grams of VDF had been introduced, the monomer feeds were discontinued and the reactor was cooled. The resulting dispersion had a solid content of 31.1 wt % and a pH of 3.4. The mean particle size in the latex was 259 nm and the total amount of dispersion was about 3,880 grams.

For the coagulation, 3000 g of the dispersion made as described above was added to 3,038 g of a 1.25 wt % aqueous solution of $MgCl_2$. The crumb was recovered by filtering the coagulate through cheese cloth and gently squeezing to remove excess water. The crumb was returned to the coagulation vessel and rinsed with deionized water a total of 4 times. After the final rinse and filtration, the crumb was dried in a 130° C. oven for 16 hrs. The resulting fluoroelastomer raw gum had a Mooney viscosity of 55 at 121° C.

The fluoroelastomer by FT-IR analysis contained 79.7 mol % copolymerized units of VDF and 20.3 mol % HFP. The fluorine content was 65.6 wt %.

Synthesis of FKM5

An 80 liter reactor was charged with 51 kg water, 36.8 g diethyl malonate (DEM), an aqueous solution containing 112.9 g ammonium persulfate (APS, $(NH_4)_2S_2O_8$), and 103 g potassium phosphate dibasic ($K_2HPO_4$). Containers from which the solid reagents were added were rinsed, and the rinse water, totaling 500 g, was added to the reactor. The reactor was evacuated; the vacuum was broken and the vessel was pressurized with nitrogen to 25 psi (0.17 MPa). This evacuation and pressurization cycle was repeated three times. After removing oxygen, the reactor was heated to 73.8° C. and pressurized with 440 g hexafluoropropylene (HFP). The reactor was then charged with 2780 g vinylidene fluoride (VDF) and 2180 g of hexafluoropropylene (HFP). The reactor was agitated at 450 rpm. As reactor pressure dropped due to monomer consumption in the polymerization reaction, HFP and VDF were continuously fed to the reactor to maintain the pressure at 155 psi (1.11 MPa). The ratio of HFP and VDF was 0.651 by weight. After 14.884 kg of VDF had been introduced, the monomer feeds were discontinued and the reactor was cooled. The resulting dispersion had a solid content of 31.9 wt % and a pH of 3.7. The mean particle size in the latex was 325 nm. The coagulation was done according to the method described under "Synthesis of FKM4".

Synthesis of $CH_2$=$CH(CF_2)_3SO_2H$

In a 600 mL PARR pressure reactor, 198.4 g (MW=404, 0.491 mol) $I(CF_2)_3I$ was reacted with 15.4 g (MW=28, 0.55 mol) $CH_2$=$CH_2$ (charged in portions) in the presence of 4.58 g "VAZO-67" (E.I. du Pont de Nemours & Co, Wilmington, Del.) at 60° C. for 24 hrs under 60 psi (414 kPa) or less. Distillation afforded 95 g $ICH_2CH_2CF_2CF_2CF_2I$ with a boiling point at 54-62° C. 1 mm-Hg. From $^{19}F$ NMR analysis, the NMR purity is ~98% with small amount of unreacted $I(CF_2)_3I$ and bis-adduct, I(CH2)2(CF2)3(CH2)2I (isolated yield: ~44.8%). $^{19}F$ NMR analysis confirmed the product: −58 ppm (txt, 2F, —CF2I), −113 (txt, 2F), −114 (m, 2F); $^1H$ NMR of $ICH_2CH_2CF_2CF_2CF_2I$: 3.5 ppm (m, 2H), 3.0 (m, 2H, —$CF_2CH_2$—).

Under nitrogen, 43.5 g (MW=432, 0.1 mol) of the above distilled $ICH_2CH_2CF_2CF_2CF_2I$ was treated with 26 g $Na_2S_2O_4$ (MW=174, 91%, 0.136 mol) and 13 g $NaHCO_3$ (MW=84, 0.154 mol) in 50 g $CH_3CN$ and 68 g $H_2O$ at room temperature for 2 hrs. $^{19}F$ NMR analysis of the reaction solution showed complete conversion of —$CF_2I$ (−67 ppm) to form the corresponding —$CF_2SO_2Na$ at ~−130 ppm yielding the desired $ICH_2CH_2(CF_2)_3SO_2Na$. The mixture was filtered to remove solids. The filtered solution showed two phases, and only top phase showed fluorinated product based on $^{19}F$ NMR analysis. The top phase was separated, and the solvents were removed by rotary evaporation to give 48 g wet solid. The wet solid was dissolved in water and the following chemical shifts were recorded and confirmed the designed product. $^{19}F$ NMR of $ICH_2CH_2CF_2CF_2CF_2SO_2Na$: −115 ppm (dxtxt, 2F, —CF2CH2-), −124 (m, 2F), −130 (t, 2F, —CF2SO2M); 1H NMR of $ICH_2CH_2CF_2CF_2CF_2SO_2Na$: 3.2 ppm (txm, 2H, —CF2CH2-), 2.5-3.0 (m, 2H, —CH2I).

The above $ICH_2CH_2(CF_2)_3SO_2Na$ wet solid was dissolved in ethanol and treated with 8.7 g KOH (MW=56, 85%, 0.132 mol) at room temperature, then the mixture was reacted at 50° C. for 8 hrs to precipitate a solid (KI). The reaction mixture was cooled to 20° C. and filtered to remove solids. No significant change in $^{19}F$ NMR was observed. The solvent was stripped and the resulting solid was acidified with 2N $H_2SO_4$ to a pH<2. The acidified solution was extracted with t-butylmethyl ether (three times, 100 mL each) and the combined ether solution was dried over $MgSO_4$. Finally, the solution was filtered and the solvent was stripped to yield 21.5 g (MW=242, 88.8 mmol) desired semisolid product, $CH_2$=$CH(CF_2)_3SO_2H$, which is soluble in water. The structure of the product was confirmed by NMR analyses, $^{19}F$ NMR, −115 (dxt, 2F, =CHCF2-), −125 (txm, 2F), −127 (t, 2F, —CF2SO2H). $^1H$ NMR, 4.4~5.6 (m) ppm, indicating no more $ICH_2CH_2$— signal. The isolated yield is ~88.8% from $ICH_2CH_2CF_2CF_2CF_2I$.

Synthesis of FKM6

The polymerization was carried out as with FKM4 with the following changes. 10 g of $CH_2=CH(CF_2)_3SO_2H$ (in an 8% aqueous solution) was used in place of $MV4SO_2NH_4$. The reactor was also heated to 80° C. The mean particle size in the latex was 243 nm and the resulting fluoroelastomer raw gum had a Mooney viscosity of 50 at 121° C. The fluoroelastomer by FT-IR analysis contained 80.2 mol % copolymerized units of VDF and 19.8 mol % HFP. The fluorine content was 65.4 wt %.

Synthesis of FKM7

A 4 liter reactor was charged with 2,250 g water, 1.7 g diethyl malonate (DEM), an aqueous solution containing 5.2 g ammonium persulfate (APS, $(NH_4)_2S_2O_8$), 5.0 g potassium phosphate dibasic ($K_2HPO_4$), and 17.6 g of the $MV4SO2NH_4$ vinyl sulfinate monomer (ammonium salt). Containers from which the solid reagents were added were rinsed, and the rinse water, totaling 425 g, was added to the reactor. The reactor was evacuated; the vacuum was broken and the vessel was pressurized with nitrogen to 25 psi (0.17 MPa). This evacuation and pressurization cycle was repeated three times. After removing oxygen, the reactor was heated to 73.9° C. and pressurized with 22 g hexafluoropropylene (HFP). The reactor was then charged with 139 g vinylidene fluoride (VDF) and 109 grams of hexafluoropropylene (HFP). The reactor was agitated at 650 rpm. As reactor pressure dropped due to monomer consumption in the polymerization reaction, HFP and VDF were continuously fed to the reactor to maintain the pressure at 160 psi (1.11 MPa). The ratio of HFP and VDF was 0.651 by weight. After 752.5 grams of VDF had been introduced, the monomer feeds were discontinued and the reactor was cooled. The resulting dispersion had a solid content of 33.9 wt % and a pH of 3.4. The mean particle size in the latex was 141 nm and the total amount of dispersion was about 4,027 grams.

The coagulation was done according to the method described under "Synthesis of FKM4".

Materials

| Material Name | Description |
|---|---|
| MV4S | $CF_2=CF-O-C_4F_8-SO_2F$, made as described in the Example (section A to C) of U.S. Pat. No. 6,624,328 (Guerra) |
| MV4SO2H/ MV4SO2NH4 | $CF_2=CFOC_4F_8SO_2H$ synthesized as per "MV4SO2H/ MV4SO2NH4 SYNTHESIS" |
| $I(CF_2)_3I$ | May be obtained by distillation purification from the reaction mixture of U.S. Pat. No. 6,002,055 example 6. |
| PPA3 | A synergistic polyethylene glycol and branched fluoroelastomer blend commercially available as "DYNAMAR FX-5930 from 3M Company, St.Paul, MN. The branching is accomplished without sulfinates. |
| FKM 4 | Branched fluoroelastomer dipolymer prepared with MV4SO2NH4 as per "SYNTHESIS OF FKM4" |
| FKM5 | Linear fluoroelastomer prepared according to the "SYNTHESIS OF FKM5" |
| FKM6 | Branched fluoroelastomer dipolymer prepared with $CH_2=CH(CF_2)_3SO_2H$ as per "SYNTHESIS OF FKM6" |
| FKM7 | Branched fluoroelastomer made via batch addition of MV4SO2NH4 as per "SYNTHESIS OF FKM7" |
| PPA1 | A 70 MV fluoroelastomer prepared as per "SYNTHESIS OF PPA1". |
| PPA2 | A synergistic polyethylene glycol and fluoroelastomer blend commercially available as "DYNAMAR FX 5920A" from 3M Company, Maplewood, MN) |
| 2MI LLDPE | A Linear Low Density Polyethylene commercially available as "LL 1002.09" from ExxonMobil Chemical Company, Houston, TX |
| 0.9MI LLDPE | A Linear Low Density Polyethylene commercially available as "MARFLEX 7109" from, Chevron Phillips Chemical Company, The Woodlands, TX |
| Talc | 60% talc in polyethylene ("ABT-2500") concentrate, commercially available as "AMPACET # 101558" from Ampacet, Tarrytown, NY |
| Erucamide | 5% erucamide in polyethylene concentrate, commercially available as "AMPACET # 10090" from Ampacet, Tarrytown, NY |
| Purge compound | Commercially available as "POLYBATCH KC-30" from A. Schulman, Akron, OH |
| Antioxidant | Commercially available as "IRGANOX B-900" from BASF Corporation, Florham Park, NJ |
| Acid neutralizer | Commercially available as "ZINC STEARATE # 33238" from Alfa Aesar, Ward Hill, MA |

TABLE 1

| | Temp. ° C. (° F.) | MV4S g | log Eta Zero @ 265° C. Pa·s | Mooney Viscosity | IV dL/g | η mL/g | LCBI |
|---|---|---|---|---|---|---|---|
| FKM7 | 74 (165) | 17.6 | 4.90 | 56 | 0.31 | 31 | NM* |
| FKM4 | 73 (164) | 15 | 6.39 | 55 | 0.87 | 89 | 2.2 |
| PPA1 | 71 (160) | — | 5.81 | 70 | NM | NM | 0.0 |
| FKM from PPA2 | NM | — | 3.09 | 33 | NM | NM | 0.0 |
| FKM from PPA3 | NM | — | NM | 42 | 0.89 | NM | ~5 |
| FKM5 | 74 (165) | — | NM | 55 | NM | NM | NM |
| FKM6 | 74 (165) | — | 3.98 | 50 | NM | NM | NM |

NM = not measured
*NM = not measured due to poor solubility of the elastomer

Example 1

A concentrate comprising 3% of a branched elastomer FKM4 with a Mooney viscosity of 55 was prepared according to the method described above. It was tested on the Keifel film line as described, at a level of 350 ppm, in a 0.9 MI LLDPE formulation containing 6000 ppm of talc and 1000 ppm of erucamide. Melt fracture was eliminated in 50 min.

Comparative Example 1

A linear elastomer FKM5 with a Mooney viscosity of 55 was tested under the conditions of Example 1. Melt fracture was eliminated in 80 min.

Comparative Example 2

A commercial linear elastomer PPA1 with a Mooney viscosity of 68 was tested under the conditions of Example 1. Melt fracture was eliminated in 60 min.

Example 2

A branched elastomer FKM6 with a Mooney viscosity of 50 was prepared.

TABLE 2

% Melt Fracture Remaining vs. Time

| Time (min) | EX1 | CE1 | CE2 |
|---|---|---|---|
| 0 | 100 | 100 | 100 |
| 10 | 100 | 100 | 100 |
| 20 | 77 | 100 | 78 |
| 30 | 18 | 60 | 7 |
| 40 | 2 | 21 | 2 |
| 50 | 0 | 9 | 0.5 |
| 60 |  | 3 | 0 |
| 70 |  | 1 |  |
| 80 |  | 0 |  |
| 90 |  |  |  |
| 100 |  |  |  |
| 110 |  |  |  |
| 120 |  |  |  |

Example 3

A concentrate comprising 1.5% of a branched elastomer FKM4 and 1.5% of polyethylene glycol (3% PPA) was prepared according to the method described above. It was tested on the Keifel film line as described, at a level of 250 ppm, in a 0.9 MI LLDPE formulation containing 7500 ppm of talc and 1500 ppm of erucamide. Melt fracture was eliminated in 80 min.

Example 4

A concentrate comprising 1.5% of a moderately branched elastomer FKM7 and 1.5% of polyethylene glycol (3% PPA) was prepared according to the method described above. FKM7 was made with sulfinate added batchwise unlike the continuous addition with FKM4. The concentrate was tested on the Keifel film line as described, in a 0.9 MI LLDPE formulation containing 7500 ppm of talc and 1500 ppm of erucamide. For this evaluation, the PPA was added at a level of 250 ppm for the first hour and increased to 400 ppm afterward. 47% melt fracture remaining after 90 min.

Comparative Example 3

A 3% concentrate of PPA2 was tested under the conditions of Example 3, with the exception that the PPA level was 1500 ppm. 100 min were required to eliminate melt fracture.

Comparative Example 4

A concentrate comprising 3% PPA3 was tested under the conditions of Example 3. Melt fracture was eliminated in 60 min.

Comparative Example 5

A 3% concentrate of PPA1 was tested under the conditions of Example 4. There was 8% melt fracture remaining after 120 min.

TABLE 3

% Melt Fracture Remaining vs. Time

| Time (min) | EX3 | EX4 | CE3 | CE4 | CE5 |
|---|---|---|---|---|---|
| 0 | 100 | 100 | 100 | 100 | 100 |
| 10 | 100 | 100 | 100 | 100 | 100 |
| 20 | 87 | 100 | 100 | 80 | 100 |
| 30 | 58 | 99 | 92 | 30 | 95 |
| 40 | 29 | 97 | 71 | 4 | 85 |
| 50 | 13 | 90 | 50 | 1 | 70 |
| 60 | 4 | 85 | 29 | 0 | 65 |
| 70 | 1 | 75 | 7 |  | 31 |
| 80 | 0 | 64 | 0.5 |  | 28 |
| 90 |  | 47 | 0.5 |  | 20 |
| 100 |  |  | 0 |  | 14 |
| 110 |  |  |  |  | 8 |
| 120 |  |  |  |  | 8 |

Foreseeable modifications and alterations of this invention will be apparent to those skilled in the art without departing from the scope and spirit of this invention. This invention should not be restricted to the embodiments that are set forth in this application for illustrative purposes. To the extent that there is a conflict or discrepancy between this specification and the disclosure in any document incorporated by reference herein, this specification will control.

What is claimed is:

1. A melt-processible polymer composition comprising:
a non-fluorinated melt-processible polymer; and
a fluorine-containing polymer comprising an end-group having a structures from group consisting of:

Formula (III)

Formula (IV)

and combinations thereof;
wherein $X_1$, $X_2$, and $X_3$ are each independently selected from H, F, Cl, a $C_1$ to $C_4$ alkyl group, and a $C_1$ to $C_4$ fluorinated alkyl group; $R_7$ is a linking group comprising at least 2 or more catenary atoms; and $Z_1$ and $Z_2$ are independently selected from F, $CF_3$, and a perfluoroalkyl group.

2. The melt-processible polymer composition of claim 1, wherein the end-group is selected from:

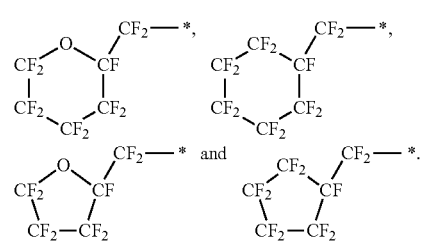

3. The melt-processible polymer composition claim 1, further comprising a synergist.

4. The melt-processible polymer composition of claim 3, wherein the synergist is polyethylene glycol or polycaprolactone.

5. The melt-processible polymer composition of claim 1, wherein the fluorine-containing polymer is crystalline.

6. The melt-processible polymer composition of claim 1, wherein the fluorine-containing polymer is semi-crystalline, or amorphous.

7. The melt-processible polymer composition of claim 1, wherein the fluorine-containing polymer is partially fluorinated.

8. The melt-processible polymer composition of claim 1, wherein the fluorine-containing polymer is fully fluorinated.

9. The melt-processible polymer composition of claim 1, wherein the fluorine-containing polymer further comprises interpolymerized units of a monomer, wherein the monomer is selected from: dienes, halogenated alkenes, a fluoroalkyl substituted ethylene, allyl iodide, fluorinated alkyl vinyl ethers, fluorinated alkoxy vinyl ethers, olefins, acrylates, styrene, vinyl ethers, and combinations thereof.

10. The melt-processible polymer composition of claim 9, wherein the monomer is selected from: tetrafluoroethylene, hexafluoropropylene, trifluoroethylene, vinylidene fluoride, vinyl fluoride, bromotrifluoroethylene, chlorotrifluoroethylene, $CF_3CH{=}CF_2$, $C_4F_9CH{=}CH_2$, $CF_2{=}CHBr$, $CH_2{=}CHCH_2Br$, $CF_2{=}CFCF_2Br$, $CH_2{=}CHCF_2CF_2Br$, and combinations thereof.

11. The melt-processible polymer composition of claim 1, wherein the melt-processible polymer composition comprises 1 to 50 weight % of the fluorine-containing polymer.

12. The melt-processible polymer composition of claim 1, wherein the melt-processible polymer composition comprises 0.002 to 2 weight % of the fluorine-containing polymer.

13. The melt-processible polymer composition of claim 1, wherein the non-fluorinated melt-processible polymer is selected from at least one of: a polyamide, a polyester, a chlorinated polyethylene, a polyvinyl resin, a polycarbonate, a polyketone, a polyurea, a polyimide, a polyurethanes, a polyolefin, and a polystyrene.

14. The melt-processible polymer composition of claim 1, wherein the fluorine-containing polymer has an LCBI of greater than 0.2.

15. An article comprising the melt-processible polymer composition of claim 1.

* * * * *